US012179505B2

(12) United States Patent
Brückner

(10) Patent No.: US 12,179,505 B2
(45) Date of Patent: Dec. 31, 2024

(54) SUBLIMATION PRINTING OF HEAT SENSITIVE MATERIALS

(71) Applicant: DSM Protective Materials B.V., Geleen (NL)

(72) Inventor: Tina Brückner, Echt (NL)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 69 days.

(21) Appl. No.: 17/787,145

(22) PCT Filed: Dec. 17, 2020

(86) PCT No.: PCT/EP2020/086856

§ 371 (c)(1),
(2) Date: Jun. 17, 2022

(87) PCT Pub. No.: WO2021/123042

PCT Pub. Date: Jun. 24, 2021

(65) Prior Publication Data

US 2023/0123558 A1 Apr. 20, 2023

(30) Foreign Application Priority Data

Dec. 20, 2019 (EP) .................................... 19218899

(51) Int. Cl.
*B41M 5/035* (2006.01)

(52) U.S. Cl.
CPC ................................ *B41M 5/0358* (2013.01)

(58) Field of Classification Search
CPC .............. B41M 5/0358; B41M 5/0256; B41M 2205/02; B41M 5/035; B41M 5/41; B41M 5/42; B41M 5/44; B41M 5/5272

(Continued)

(56) References Cited

U.S. PATENT DOCUMENTS

| | | | |
|---|---|---|---|
| 4,984,517 | A | 1/1991 | Doublet |
| 5,470,632 | A | 11/1995 | Meldner et al. |

(Continued)

FOREIGN PATENT DOCUMENTS

| | | |
|---|---|---|
| CN | 1030270 | 1/1989 |
| CN | 1239455 | 12/1999 |

(Continued)

OTHER PUBLICATIONS

International Search Report for PCT/EP2020/086856 dated Apr. 26, 2021 (3 pages).

(Continued)

*Primary Examiner* — Jason S Uhlenhake
*Assistant Examiner* — Alexander D Shenderov
(74) *Attorney, Agent, or Firm* — NIXON & VANDERHYE P.C.

(57) ABSTRACT

The present invention further relates a sublimation printing process of a multilayer system comprising a polyester top layer and at least one heat sensitive polymer layer whereby a temperature gradient is applied during sublimation printing such that the heat sensitive polymer layer is maintained at a temperature below its melting temperature and the polyester top layer is maintained at a temperature above its glass transition temperature to allow diffusion of a sublimation dye into the polyester top layer. The temperature gradient is maintained by using a heat sink element beneath the heat sensitive polymer layer. The temperature gradient can also be maintained by cooling the heat sink element. The cooling preferably occurs with a circulating coolant. The heat sink element comprises a polymer, a ceramic or a metal. The invention further relates to a sublimation printed multilayer system comprising a polyester top layer and at least one heat sensitive polymer layer. The present invention also relates to (Continued)

the multilayer system in the manufacturing of textile, tents, outdoor gear, apparel, clothing, bags, jackets, gloves.

23 Claims, 2 Drawing Sheets

(58) Field of Classification Search
USPC .......................................................... 347/179
See application file for complete search history.

(56) References Cited

U.S. PATENT DOCUMENTS

| | | | | |
|---|---|---|---|---|
| 5,534,098 | A | 7/1996 | Kerle | |
| 6,440,251 | B1 | 8/2002 | Christiansen | |
| 2002/0012038 | A1* | 1/2002 | Xu | B41M 5/395 347/213 |
| 2003/0192136 | A1* | 10/2003 | Magee | D06P 5/004 8/500 |
| 2004/0157735 | A1 | 8/2004 | Hare | |
| 2005/0070434 | A1 | 3/2005 | Drake | |
| 2007/0039682 | A1* | 2/2007 | Drake | B44C 1/1712 347/171 |
| 2010/0129621 | A1* | 5/2010 | Langan | B32B 27/304 428/201 |
| 2011/0086208 | A1 | 4/2011 | Nemphos, Jr. et al. | |
| 2012/0073063 | A1* | 3/2012 | Downs | B32B 5/024 8/470 |
| 2012/0100334 | A1* | 4/2012 | Adams | B32B 27/40 428/109 |
| 2016/0263916 | A1 | 9/2016 | Noh et al. | |
| 2017/0100952 | A1 | 4/2017 | Aoyagi et al. | |
| 2019/0315118 | A1* | 10/2019 | Landa | B41M 5/38221 |

FOREIGN PATENT DOCUMENTS

| | | |
|---|---|---|
| CN | 101151165 | 3/2008 |
| CN | 202895942 | 4/2013 |
| CN | 105200827 | 12/2015 |
| CN | 105722685 | 6/2016 |
| DE | 4329741 | 9/1995 |
| GB | 2 042 414 | 9/1980 |
| WO | 01/73173 | 10/2001 |
| WO | 2006/094312 | 9/2006 |
| WO | 2011/163643 | 12/2011 |
| WO | 2016/151409 | 9/2016 |

OTHER PUBLICATIONS

Written Opinion of the ISA for PCT/EP2020/086856 dated Apr. 26, 2021 (7 Pages).
Loctite SI 5011CL RTV Clear Silicone, Safety Data Sheet, Rev. No. 006.0, IDH No. 234323, Henkel Corporation, May 7, 2014.
Superflex, Safety Data Sheet, Corporate Facility Supply, Jan. 2018.

* cited by examiner

SUBLIMATION PRINTING OF HEAT SENSITIVE MATERIALS

This application is the U.S. national phase of International Application No. PCT/EP2020/086856 filed Dec. 17, 2020 which designated the U.S. and claims priority to EP 19218899.3 filed Dec. 20, 2019, the entire contents of each of which are hereby incorporated by reference.

FIELD

The present invention relates to a sublimation printing process of a multilayer system comprising a polyester top layer. The invention further relates to the multilayer system. The invention further relates to the use of the multilayer system.

BACKGROUND AND SUMMARY

Sublimation printing, also referred to as dye sublimation printing, is a printing method for transferring images onto a substrate (usually a cloth material such as polyester fabric). Sublimation refers to a process where a substance such as a dye moves from a solid to a gas state. Sublimation printing normally involves the use of a digital printer to either produce mirrored images on a transfer media or to print the sublimation dye directly onto the substrate. The polyester fabric (with the transfer media) is exposed to heat and pressure at temperatures from 180 to 230 degrees C. This allows the dye to move into the gas state and to open the polyester fabric structure. Once the dye is in gas state, it permeates into the polyester fabric. When the heat is removed, the dye is locked permanently into place in the polyester. The finest quality of sublimation printing is that which does not fade or crack on the polyester. The prints are very light and do not have any harsh texture. In principle any garment or object with a polyester base or polyester coating can be designed with the help of sublimation printing. However, if the substrate contains a heat sensitive material, it will be destroyed during the fixation process.

Dye sublimation printing is thus a standard process used for customized/patterned sportswear or Apparel, like jerseys, pants or Jackets made of polyester fabrics. As previously said dye sublimation printing is difficult to apply to fabrics comprising heat sensitive materials because of the high temperatures that are required for the sublimation of the dyes. The high temperatures damage the heat sensitive material. This will moreover sacrifice on the color depth and color fastness of the print. In the textile fabrics/fibers industry, the coloration of fabrics/fibers is however a requirement for a large number, if not a majority of military, commercial, apparel, industrial, medical and aerospace applications.

In US2011086208 a process is disclosed of making waterproof fabrics wherein a heat sensitive layer comprising a layer of polypropylene fiber and elastomeric fiber is laminated to a membrane which is laminated to a third layer of dye sublimated polyester elastomeric yarn. In this process the polyester layer is dye sublimated before lamination to membrane and the heat sensitive layer. It is therefore an object of the present invention to provide a sublimation printing process on a multilayer system comprising heat sensitive polymers without damaging the heat sensitive polymer layer.

It is another object of the present invention to provide an equal print quality on multilayer systems comprising a heat sensitive polymer layer.

It is a further object of the present invention to provide a sublimation printing process on multilayer systems comprising a heat sensitive polymer layer to produce prints with a good color depth and color fastness.

The object of the present invention is achieved in providing a dye sublimation printing process of a multilayer system comprising a polyester top layer and at least one heat sensitive polymer layer whereby a temperature gradient is applied during sublimation printing such that the heat sensitive polymer layer is maintained at a temperature below its melting temperature and the polyester top layer is maintained at a temperature above its glass transition temperature to allow diffusion of the sublimation dye into the polyester top layer. Preferably the polyester layer and the layer comprising heat sensitive polymer are in contact with each other.

Unexpectedly it has been found that printed multilayer systems comprising at least a heat sensitive polymer layer can be provided without being damaged by heat during dye sublimation printing process while the printed multilayer system shows a good print quality, a good color depth, good color fastness and/or a good resolution.

Sublimation techniques for the coloration of heat sensitive materials such as ultra-high molecular weight polyethylene (UHMWPE) are known from for example WO16151409. It is disclosed that a UHMWPE material such as a fiber, a braid or a laminate composite material may be colored via coloration methods that allows infusion of colorant directly into the gel spun UHMWPE fibers themselves under controlled conditions of heat and pressure.

Also in WO2011163643 sublimation printing is disclosed whereby a dye is transferred to a composite material. The process comprises: applying the dye to a transfer media to create a colored transfer media; placing the colored transfer media into contact with the composite material; and applying, using an autoclave, at least one of heat, external pressure, vacuum pressure to infuse the dye to the composite material to create a colored composite material. After sublimation printing the composite material is cooled to a temperature such that the composite material maintains a desired shape. A disadvantage of this sublimation printing process is that cooling occurs after the printing step which means that in case a heat sensitive polymer layer is used it will be damaged during the sublimation printing process.

DETAILED DESCRIPTION

Figure 1:
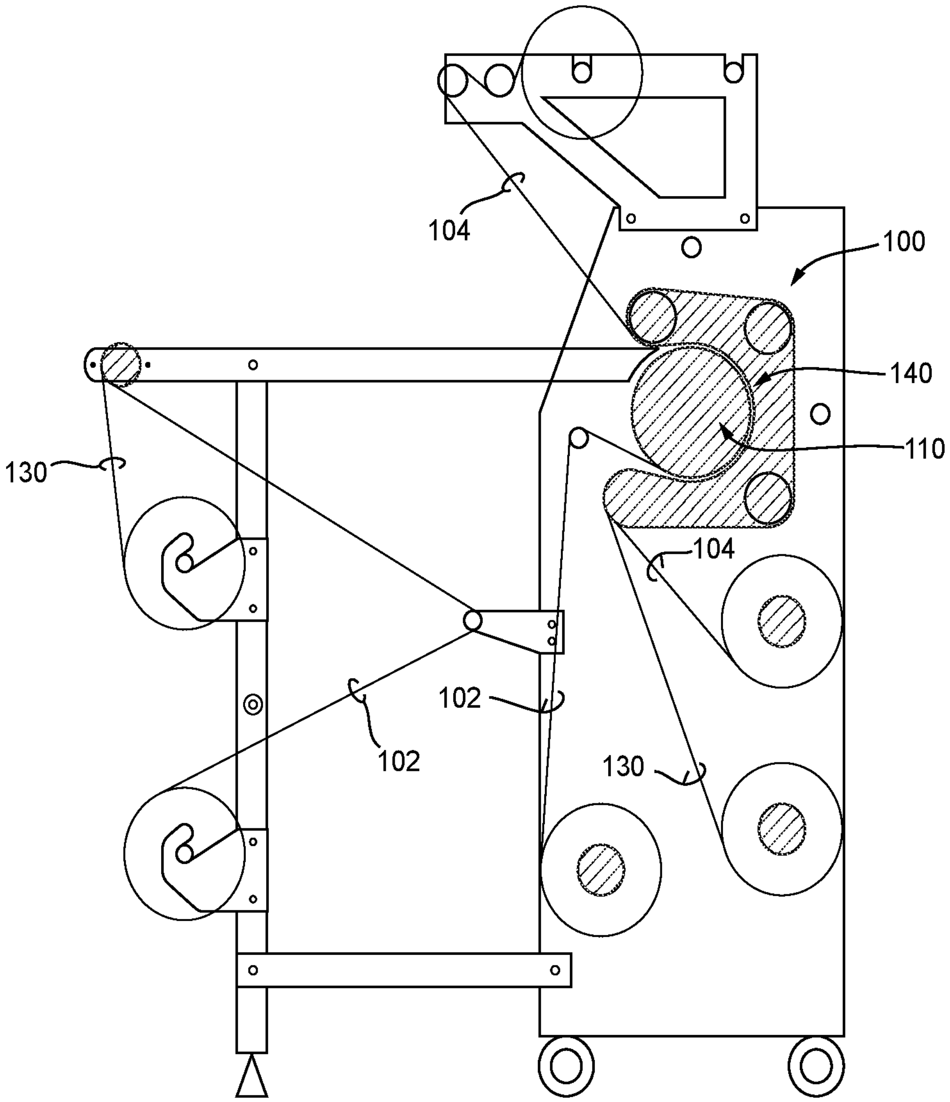
FIG. 1 is schematic elevational view of a calender sublimation apparatus with a cooling area.
Figure 2:
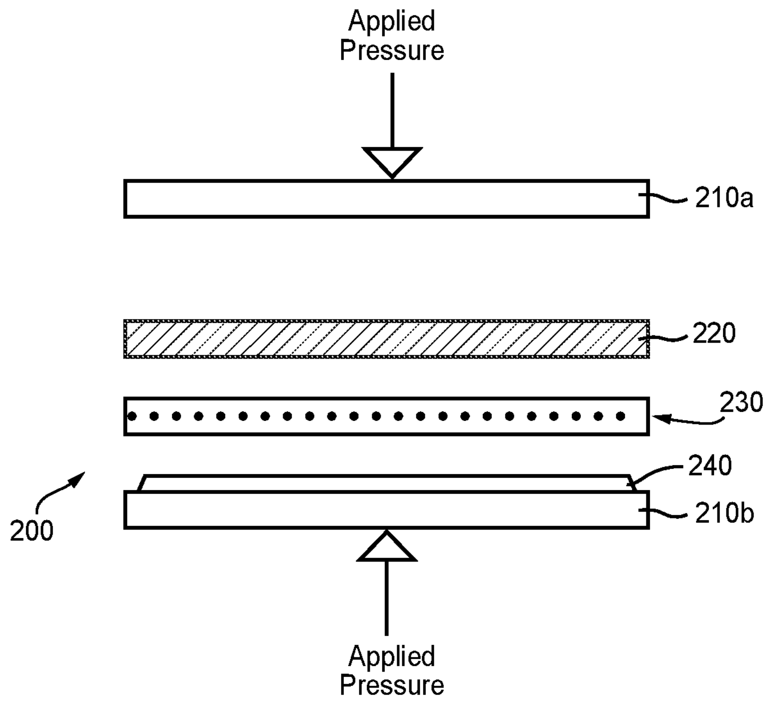
FIG. 2 is schematic elevational view of a flat press sublimation apparatus with a cooling area.

The sublimation printing process according to the present invention can be practiced using a continuous calender apparatus 100 as shown in FIG. 1 or a batch plate apparatus 200 as shown in FIG. 2. In the embodiment of the continuous apparatus 100 shown in FIG. 1, the multilayer system 130 may be unwound from a roll and positioned between a transfer paper 102 and a tissue paper 104 introduced into a heated calander 110. In the embodiment of the batch plate apparatus 200 shown in FIG. 2, the multilayer system 230 may be positioned between a heated upper plate 210*a* and a cooled lower plate 210*b* with a transfer substrate 220 interposed between the multilayer system 230 and the heated upper plate 210*a*.

The sublimation printing process according to the present invention preferably comprises the following steps:

Step 1. Providing a multilayer system (e.g, the multilayer system 130 in FIG. 1 or the multilayer system 230 in FIG. 2) comprising a polyester top layer and a heat sensitive polymer layer comprising a polymer having a melting point below sublimation temperature.

Step 2. Printing of designs via a transfer substrate or directly on the multilayer system using one or more sublimable dyes.

Step 3. Placing either the printed multilayer system or the printed transfer substrate and the multilayer system together and pass them/it through a heated calender 110 of the calander apparatus 100 or between the plates 210*a*, 210*b* of the press plate apparatus 200 while a temperature gradient is applied to maintain the temperature of the heat sensitive polymer layer below its melting temperature while the sublimation temperature at the polyester top layer is maintained at a temperature above its glass transition temperature.

In step 1 of the above described processes the multilayer system comprises a polyester fabric top layer preferably polyethylene terephthalate (PET) or polybutylene terephthalate (PBT). The PET or PBT can be fibers. The multilayer system further comprises at least a heat sensitive polymer layer comprising a polymer having a melting point below the dye sublimation temperature. Examples of polymers with a melting temperature below sublimation temperature are polyolefins such as polyethylene, a polyester block copolymer, polyurethanes or polyamides. Preferably the heat sensitive polymer layer comprises polyethylene or a polyester block copolymer. More preferably the heat sensitive polymer layer comprises UHMWPE or ARNITEL® VT high-performance thermoplastic copolyester. UHMWPE is a type of polyolefin made up of extremely long chains of polyethylene that is available under the trade names of DYNEEMA® and SPECTRA®. UHMWPE is also referred to in the industry as either high-modulus polyethylene (HMPE) or high-performance polyethylene (HPPE). The molecular weight (MW) of UHMWPE is often expressed as "Intrinsic Viscosity" (IV), which is typically at least 4 dl/g and preferably at least 8 dl/g. Generally, the IV for UHMWPE is less than about 50 dl/g, and preferably less than about 40 dl/g. In various embodiments, the UHMWPE fibers comprise extruded polymer chains. In various embodiments, the UHMWPE fibers comprise pultruded polymer chains.

In step 2 a digital printer can be used to produce mirrored images on the transfer substrate. The transfer substrate may comprise at least one of transfer paper, a transfer laminate, or a transfer film. The dye may be applied to the transfer substrate in the shape of a pattern, graphic or logo. In addition, the dye may also be applied to the multilayer system using direct printing.

In step 3 the printed substrate and the multilayer system will either pass together through the heated calendar apparatus 100 having a heated calander 110 (FIG. 1) or the press apparatus 200 (FIG. 2) having a heated upper plate 210*a*. Each of the heated calander 110 and the heated plate 210 can be heated to temperatures up to 230° C. A temperature gradient is applied in a cooling area 140 in the calendar apparatus 100 (FIG. 1) or a cooling area 240 associated with the lower plate 210*b* of the press apparatus 200 (FIG. 2). The temperature gradient maintains the temperature of the heat sensitive polymer layer below its melting temperature while the sublimation temperature at the polyester top layer is maintained at a temperature above its glass transition temperature. It is clear that the sublimation temperature at the polyester top layer is below the melting temperature of the polyester.

The temperature gradient is essential in reaching printed multilayer systems comprising heat sensitive polymers with a good print quality, a good color depth, good color fastness and/or a good resolution. The temperature gradient can be applied passively or actively. In case of a passive temperature gradient a heat sink element is used beneath the heat sensitive polymer layer. Preferably the heat sink element comprises a polymer, a ceramic or a metal. More preferably the heat sink element comprises a metal. Alternatively, the temperature gradient can also be applied actively whereby the heat sink element is further cooled. Cooling of the heat sink element may take place via a peltier plate or a plate with a circulating coolant such as oil or water.

The heat sink element as used in the present invention means an element that provides an efficient path for heat to be transferred into the environment. The general theory behind a heat sink is to increase the surface area of the heat-producing device, enabling a more efficient transfer of heat into the environment. This improved thermal pathway reduces the temperature rise of the heat sensitive polymer layer.

In dye sublimation printing from a transfer medium the parameters affecting the transfer printing process are (a) temperature, (b) time, and (c) the proportion of dye that actually transfers or is directly printed on the multilayer system. In case of sublimation printing via a transfer substrate, the sublimation temperature ranges from 180-230° C., preferably from 190-220° C., more preferably from 200-210° C. for 10-80 seconds, preferably for 20-70 seconds, more preferably for 30-60 seconds. In case of direct printing of dyes on the multilayer system, sublimation temperature ranges from 170-230° C., preferably from 180-220° C., more preferably from 190-210° C. for a time varying from 10-80 seconds, preferably for 20-70 seconds, more preferably for 30-60 seconds.

The multilayer system used in the sublimation printing process of the present invention can be in the form of a film, a fabric, a laminate, a felt structure, a composite structure and/or combinations thereof. The multilayer system will in what kind of form it is always comprise a polyester in the top layer.

By term "composite" is herein understood a material comprising fibers and a matrix material, e.g. a co(polymer) resin impregnated through the fibers and/or coated on the fibers. The matrix material is typically a liquid (co)polymer resin impregnated in between the fibers and optionally subsequently hardened. Hardening or curing may be done by any means known in the art, e.g. a chemical reaction, or by solidifying from molten to solid state. Suitable examples include thermoplastic or thermoset resins, epoxy resins, polyester or vinylester resins, or phenolic resins. A composite may comprise at least two different kind of fibers, whereby the fibers have different chemical structure and properties.

By term "fiber" is herein understood an elongated body, the length dimension of which is much greater than the transverse dimensions of width and thickness. Accordingly, the term fiber includes filament, ribbon, strip, band, tape, and the like having regular or irregular cross-sections. The fiber may have continuous lengths, known in the art as filament or continuous filament, or discontinuous lengths, known in the art as staple fibers.

In the context of the present invention, a fabric can be of any type known in the art, for instance a woven, a non-woven or knitted fabric. These types of fabrics and way of making them are already known to the skilled person in the art. The areal density of fabrics is preferably from 10 to 2000 $g/m^2$, more preferably from 100 to 1000 $g/m^2$, even more preferably from 100 to 500 $g/m^2$, most preferably from 50 to 250 $g/m^2$.

In case that the multilayer system is in the form of a fabric it preferably comprises a double face woven or double face knitted structure. In that case the fabric preferably comprises PET or PBT fibers and UHMWPE fibers which are woven or knitted.

The multilayer system in the sublimation printing process of the present invention may also comprise a waterproof breathable membrane. The membrane is an additional layer bonded beneath the exterior face of the multilayer system. In case the multilayer system is a fabric, a membrane can be bonded to it such that a laminate is formed. By waterproof breathable is meant that the membrane is resistant to penetration by water, but it allows water vapour to pass through. Examples of waterproof breathable membranes are polytetrafluoroethylene (PTFE), polyurethane or a polyesterblock copolymer such as ARNITEL® VT.

In another embodiment of the present invention the multilayer system may comprise a polyester top layer and a composite comprising at least two unidirectional layers (UD layers) comprising heat sensitive materials whereby the first layer comprises high-performance fibers, aligned in a parallel direction in a first matrix material and a second layer comprises high-performance fibers, aligned in a parallel direction in a second matrix material. The second fiber direction is preferably offset relative to the first fiber direction by up to 90 degrees. The high-performance fiber(s) in the first and second layer may be the same or different. The composite may however also include one or more additional polymer layers bonded to the UD layers.

The high-performance fibers in the first and second layer may be the same or different. The high-performance fibers used in the first and second layers typically have a melting point below sublimation temperature of up to 220 degrees. Preferably they have a tensile strength of at least 0.5 GPa, more preferably at least 0.6 GPa, most preferably at least 0.8 GPa. The fibers preferably have a tensile strength of between 3.1 and 4.9 GPa, more preferably between 3.2 and 4.7 GPa, and most preferably between 3.3 and 4.5 GPa.

The amount of fiber in the first and second layer is generally between 1 and 50 grams per square meter. The amount of fiber may also be referred to as the fiber density of a layer. Preferably the amount of fiber in a layer is between 2 and 30 grams per square meter, more preferably between 3 and 20 grams per square meter. It has been found that fiber densities in these ranges help to maintain flexibility of the multilayer composite.

Most preferred high-performance fibers, are polyethylene fibers also referred to as highly drawn or oriented polyethylene fibers consisting of polyethylene filaments that have been prepared by a gel spinning process, such as described in for example GB 2042414 A or WO 01/73173. The advantage of these fibers is that they have very high tensile strength combined with a light weight, so that they are suitable for use in extremely thin layers. Preferably, use is made of fibers of ultra-high molar weight polyethylene (UHMWPE) with an intrinsic viscosity of at least 4 dl/g, more preferably an intrinsic viscosity of at least 8 dl/g.

The first and second matrix materials are preferably chosen from polyacrylates, polyurethanes such as Hysol US0028, polyesters such as thiokol Adcote, silicones such as DOW-96-083, -X3-6930, -6858 (UV curable), polyolefins, modified polyolefines, ethylene copolymers such as ethylene vinyl acetate, polyamide, polypropylene or thermoplastics such as PEEK, PPS, Radel, Ryton. The first and second matrix materials can be the same or different.

Preferably, the first and second matrix material comprise a polyurethane. The polyurethane may comprise a polyether-urethane or a polyester-urethane based on a polyetherdiol. The polyurethane is preferably based on aliphatic diisocyanates because this further improves product performance, including color stability.

In a further preferred embodiment, the matrix material may comprise an acrylic based resin, or a polymer comprising acrylate groups.

In case of a polyolefin the matrix material preferably comprises a homopolymer or copolymer of ethylene and/or propylene, wherein the polymeric resin has a density as measured according to ISO1183 in the range from 860 to 930 $kg/m^3$, a peak melting temperature in the range from 40° to 140° C. and a heat of fusion of at least 5 J/g. Further details of matrix materials and monolayers with unidirectional fibers may be found in for example U.S. Pat. No. 5,470,632, incorporated herein by reference in its entirety.

The amount of matrix material in the first or second layer is typically between 10 and 95 wt %; preferably between 20 and 90 wt %, more preferably between 30 and 85 wt %, and most preferably between 35 and 80 wt %. This ensures adequate bond strength between the monolayer(s) and other components, thereby reducing the chance for premature delamination in the composite after repeated flexural cycles.

The present invention also relates to the sublimation printed multilayer system obtainable via the process of the present invention.

The present invention also relates to the printed multilayer system as such. The printed multilayer system comprises a polyester top layer and at least one heat sensitive polymer layer and provides a color difference (CMC delta E) below 1 if compared to a multilayer system without the heat sensitive polymer layer. Preferably the polyester layer and the heat sensitive layer are in contact with each other. The printed multilayer system preferably comprises a color fastness of at least 3, preferably 4 more preferably 5 against dry and wet rubbing. Color fastness is measured according to ISO105-X12:2016. The burst strength of the multilayer system is preferably at least 90% compared to an unprinted multilayer system, more preferably 95%, most preferably 100% compared to an unprinted multilayer system.

The present invention also relates to the use of the printed multilayer system according to the present invention in the manufacturing of textile, tents, outdoor gear, apparel, clothing, bags, jackets, gloves.

The invention is illustrated but not limited by the following examples:

Methods of Measuring

The following are test methods as referred to herein:

Color Fastness is measured according to ISO105-X12:2016 which measures color fastness to rubbing, one with a dry rubbing cloth and one with a wet rubbing cloth.

Burst strength is measured according to ISO13938-1 (1999) at 20 degree Celsius and a relative humidity of 65% using an Autoburst SDL-Atlas M229 and a testing surface of 50 $cm^2$.

Color difference CMC-delta E is measured via ISO11664-4 (color difference with a reference) Delta E below 1 are good.

Color Strength is measured via ISO11664-4 and is defined as: [(K/S) Batch/(K/S) Standard]×100

Example 1

A double-knit fabric is provided comprising 30% UHMWPE fiber (55 dtex SK75 140TZ) and 70% polyester fiber (110 dtex texturized PET), where the polyester fiber is the top layer which is interconnected with the UHMWPE fiber inner layer. The Areal Density of the fabric is 125 g/m$^2$. For the sublimation printing a heat press (Collin PV400 2019) with individually temperature controlled upper and lower metal plates with a surface of 40×40 cm is used. The upper plate of the heat press is heated to a temperature of 230 degree C. and the bottom plate is maintained at a temperature of 70 degree C. with a circulating coolant. The double-knit fabric is placed with the UHMWPE fiber side towards the 70 degree C. metal plate and the printed transfer substrate was placed on the polyester top layer. The press is closed for 60 seconds at 2 bars pressure.

Example 2

In Example 2 a fabric according to Example 1 is used. The heat press is a flat press for sublimation printing known to a person skilled in the art as schematically depicted in FIG. 2. The heat press is heated to a temperature of 230 degree C. and additionally a stainless steel metal plate (3 mm thickness) with a starting temperature of 25 degree C. is placed beneath the heat sensitive UHMWPE fiber layer and no active cooling with a coolant is applied. The press is closed for 60 seconds at 2 bars pressure.

Results

TABLE 1

| Example | T upper plate | T bottom plate (starting temp) | Time [sec] | Color fastness Dry fabric | Color fastness Wet fabric | Colour Difference CMC dE | Colour Strength | Burst Strength kPa |
|---|---|---|---|---|---|---|---|---|
| 1 | 230 | 70 | 60 | 4 | 4/5 | 0.76 | 83.68% | 494 |
| 2 | 230 | 25 | 60 | 4 | 4/5 | 0.70 | 84.1% | 498 |
| Ref. A | 200 | 200 | NA | 5 | 5 | 1 | 100% | NA |
| Ref. B | NA | NA | NA | NA | NA | NA | NA | 508 |

From table 1 it is clear that sublimation printing of the fabrics as shown in example 1, were active cooling of the bottom plate is applied, results in a fabric with a good CMC dE and a good color strength if compared to reference A. The same is true for example 2 where no active cooling took place but starting temperature of the bottom plate was 25 degrees C. Also a good burst strength is achieved in examples 1 and 2 compared to the burst strength of reference B. References A and B relate to the double knit fabric as disclosed in example 1. In reference A the fabric is sublimation printed at 200 degrees C. without cooling during printing. In reference B the fabric is not printed and shows the original burst strength of the fabric.

COMPARATIVE EXPERIMENTS I-II

A double-knit fabric is provided comprising 30% UHMWPE fiber (55 dtex SK75 140TZ) and 70% polyester fiber (110 dtex texturized PET), where the polyester fiber is the top layer which is interconnected with the UHMWPE fiber inner layer. The Areal Density of the fabric is 125 g/m$^2$. For the sublimation printing a heat press is used.

Comparative Exp I

The heat press is heated to a temperature of 150 degree C. The press is closed for 60 seconds at 2 bars pressure.

Comparative Exp II

The heat press was heated to a temperature of 200 degree C. and no cooling during sublimation printing took place.

RESULTS

TABLE 2

| Comparative experiment. | T upper plate (° C.) | T bottom plate (starting temp ° C.) | Colour Strength | Burst Strength kPa |
|---|---|---|---|---|
| I | 150 | 70 | 15% | 500 |
| II | 200 | 200 | 100% | 100 |

From table 2 it is clear that sublimation temperature at 150 degrees C. will influence the color depth markedly in the negative way. The burst strength is, however, comparable to the burst strength of reference B. In case of sublimation printing without cooling during printing the color depth is good but the burst strength is markedly decreased, the heat sensitive polymer layer is destroyed.

The invention claimed is:

1. A dye sublimation printing process comprising the steps of:

(i) providing a multilayer system comprising a polyester top layer and at least one heat sensitive polymer layer comprising a polymer with a melting point below sublimation temperature, (ii) subjecting the multilayer system to dye sublimation printing by application of a sublimation dye to the polyester top layer of the multilayer system, and (ii) applying a temperature gradient to the multilayer system during the dye sublimation printing according to step (ii) such that the heat sensitive polymer layer is maintained at a temperature below a melting temperature thereof and the polyester top layer is maintained at a temperature above a glass transition temperature thereof to allow diffusion of the sublimation dye into the polyester top layer.

2. The dye sublimation printing process according to claim 1, wherein step (iii) comprises maintaining the temperature gradient by using a heat sink element beneath the heat sensitive polymer layer.

3. The dye sublimation printing process according to claim 2, wherein step (iii) comprises maintaining the temperature gradient by cooling the heat sink element beneath the heat sensitive polymer layer.

4. The dye sublimation printing process according to claim 3, wherein step (iii) comprises circulating a coolant to effect cooling of the heat sink element.

5. The dye sublimation printing process according to claim 2, wherein the heat sink element comprises a polymer, a ceramic or a metal.

6. The dye sublimation printing process according to claim 5, wherein the heat sink element comprises a metal.

7. The dye sublimation printing process according to claim 1, wherein the polyester top layer comprises polyethylene terephthalate (PET) or polybutylene terephthalate (PBT).

8. The dye sublimation printing process according to claim 1, wherein the sublimation dye has a sublimation temperature of at least 190° C., and wherein the heat sensitive polymer comprises a polymer with a melting temperature below the sublimation temperature of the sublimation dye.

9. The dye sublimation printing process according to claim 1, wherein the heat sensitive polymer is selected from the group consisting of polyolefins, polyamides, polyester block copolymers and polyurethanes.

10. The dye sublimation printing process according to claim 9, wherein the heat sensitive polymer is polyethylene.

11. The dye sublimation printing process according to claim 10, wherein the heat sensitive polymer is ultrahigh molecular weight polyethylene (UHMWPE).

12. The dye sublimation printing process according to claim 1, wherein the multilayer system is in the form of a multilayer film, a laminate, a knitted fabric, a woven fabric, a non-woven structure, a felt structure, a composite structure and/or combinations thereof.

13. The dye sublimation printing process according to claim 12, wherein the multilayer system is in the form of a fabric comprising a double face woven or knitted structure.

14. The dye sublimation printing process according to claim 12, wherein the multilayer system is in the form of a laminate structure further comprising a waterproof breathable membrane.

15. The dye sublimation printing process according to claim 14, wherein the waterproof breathable membrane comprises polytetrafluoroethylene (PTFE), polyurethane or a block copolyester.

16. The dye sublimation printing process according to claim 12, wherein the multilayer system is in the form of a composite comprising at least first and second unidirectional layers, wherein the first unidirectional layer comprises high-performance fibers, aligned in a parallel direction in a first matrix material, and the second unidirectional layer comprises high performance fibers, aligned in a parallel direction in a second matrix material.

17. The dye sublimation Sublimation-printing process according to claim 16, wherein the second fiber direction is offset relative to the first fiber direction by up to 90 degrees.

18. The dye sublimation printing process according to claim 16, wherein the high performance fibers in the first and second unidirectional layers are ultrahigh molecular weight polyethylene (UHMWPE) fibers which are the same or different.

19. The dye sublimation printing process according to claim 16, wherein the first and second matrix materials are the same or different and are selected from the group consisting of polyacrylates, polyurethanes, polyesters, silicones, polyolefins, and polyamides.

20. The dye sublimation printing process according to claim 19, wherein the first and second matrix materials are modified polyolefins, ethylene copolymers or polypropylene.

21. The dye sublimation printing process according to claim 1, wherein step (ii) comprises directly printing an image onto the polyester top surface of the multilayer system with the sublimation dye.

22. The dye sublimation printing process according to claim 1, wherein step (ii) comprises positioning a transfer substrate having an image formed of the sublimation dye to be transferred to the multilayer system on the polyester top layer of the multilayer system.

23. A printed multilayer system obtained by the process according to claim 1.

* * * * *